US006857982B2

(12) United States Patent
Tomari et al.

(10) Patent No.: US 6,857,982 B2
(45) Date of Patent: Feb. 22, 2005

(54) LIMITED SLIP DIFFERENTIAL

(75) Inventors: Tatsuhiro Tomari, Wako (JP); Yutaka Tashiro, Wako (JP); Akihiro Iwazaki, Wako (JP); Koji Matsubara, Wako (JP); Shinji Ohkuma, Wako (JP); Shinichi Inagawa, Wako (JP); Yasuji Shibahata, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/242,871

(22) Filed: Sep. 13, 2002

(65) Prior Publication Data

US 2003/0054914 A1 Mar. 20, 2003

(30) Foreign Application Priority Data

Sep. 19, 2001 (JP) .................................... 2001-285275
Feb. 18, 2002 (JP) .................................... 2002-040478

(51) Int. Cl.[7] ..................... F16H 48/06; F16H 48/20
(52) U.S. Cl. ....................................... 475/231; 475/234
(58) Field of Search ................................ 475/231, 233, 475/234, 235, 237, 238; 74/640

(56) References Cited

U.S. PATENT DOCUMENTS

| | | | | |
|---|---|---|---|---|
| 2,152,932 A | * | 4/1939 | Swennes | 475/231 |
| 2,424,942 A | * | 7/1947 | Mynssen | 475/233 |
| 4,776,234 A | * | 10/1988 | Shea | 475/150 |
| 5,030,181 A | * | 7/1991 | Keller | 475/150 |
| 5,125,876 A | * | 6/1992 | Hirota | 475/231 |
| 5,279,401 A | * | 1/1994 | Stall | 192/52.4 |
| 5,350,340 A | * | 9/1994 | Paul et al. | 475/237 |
| 6,398,686 B1 | * | 6/2002 | Irwin | 475/150 |
| 6,503,167 B1 | * | 1/2003 | Sturm | 475/231 |
| 6,533,699 B1 | * | 3/2003 | Fett | 475/231 |
| 6,561,939 B1 | * | 5/2003 | Knapke | 475/150 |

FOREIGN PATENT DOCUMENTS

| | | | | |
|---|---|---|---|---|
| EP | 189556 A1 | * | 8/1986 | F16H/1/445 |
| JP | 62-103226 | | 5/1987 | |

* cited by examiner

*Primary Examiner*—Tisha Lewis
(74) *Attorney, Agent, or Firm*—Carrier, Blackman & Associates, P.C.; Joseph P. Carrier; William D. Blackman

(57) ABSTRACT

A differential with a differential action limiting mechanism includes a differential mechanism D for distributing the drive force of an internal combustion engine inputted into a differential case 28 to a left-hand axle shaft 13 and a half shaft 11 which continuously connects to a right-hand axle shaft for output therefrom and friction clutches 44L, 44R for limiting differential rotations of the left-hand axle shaft 13 and the half shaft 11 relative to the differential case 28. An actuator A for generating an engagement force for bringing the friction clutches 44L, 44R into engagement is provided outside a housing 14 for accommodating therein the differential case 28, whereby an engagement force generated by the actuator A is transmitted to the friction clutches 44L, 44R via the half shaft 11.

14 Claims, 12 Drawing Sheets

LIMITED SLIP DIFFERENTIAL

BACKGROUND OF THE INVENTION

1. Field of the Invention

The present invention relates to a differential with a differential action limiting mechanism so called as a limited-slip differential that comprises a differential mechanism for distributing engine driving force inputted into a differential case to two output shafts for output therefrom and friction clutches for limiting differential rotations between the differential case and the output shafts.

2. Description of the Related Art

The aforesaid type of limited-slip differential is known through, for example, JP-B-5-36249. This limited-slip differential is provided with friction clutches and a hydraulic actuator in the interior of a housing which accommodates therein a differential case, and the hydraulic actuator so provided brings the friction clutches into engagement to thereby make the differential case and the output shafts integrated with each other for optionally generating a differential action limiting torque in a differential mechanism.

In addition, a so-called torque proportion type limited-slip differential is also known in which instead of optionally generating a differential action limiting torque in the differential mechanism, a differential action limiting torque is generated in the differential mechanism in proportion to a torque inputted in the differential mechanism. In this type of differential, the friction clutches provided in the differential case are designed to be brought into engagement with an engagement force generated by a cam mechanism in accordance with the magnitude of inputted torque.

Incidentally, when attempting to add an actuator for bringing the friction clutches into engagement so as to generate an optional differential action limiting torque to a conventional differential fitted with no slip limiting mechanism or a conventional differential fitted with a torque proportion type slip limiting mechanism a large design modification must be made to the differential mechanism for provision of the actuator therein, this causing a problem that the modification constitutes a main cause for increase in production costs.

SUMMARY OF THE INVENTION

The invention was made in view of the situation and an object thereof is to generate an optional magnitude of differential action limiting torque even if using a conventional differential mechanism as it is or with a minor design modification being made to the conventional differential mechanism.

With a view to attaining the object, according to a first aspect of the invention, there is provided a differential with a differential action limiting mechanism, so called as a limited-slip differential, comprising a differential mechanism for distributing engine driving force that is inputted in a differential case to two output shafts for output therefrom, a friction clutch member for limiting differential rotations between the two output shafts, and an actuator for generating an engagement force for bringing the friction clutch member into engagement provided on one of axes of the output shafts and outside the differential case, so that an engagement force generated by the actuator is transmitted to the friction clutch member via at least one of the output shafts.

In the above-mentioned differential with a differential action limiting mechanism according to the present invention, the actuator may be disposed coaxial with the at least one of the output shafts.

According to the construction of the differential with a differential action limiting mechanism, since the actuator for generating an engagement force for bringing the friction clutch member into engagement is not provided inside the differential case but is provided outside of the differential case and on one of the axes of the output shafts, an engagement force generated by the actuator can be transmitted to the friction clutch member via the output shafts for generating an optional magnitude of differential action limiting torque in the differential mechanism. In addition, since the actuator may be provided outside the differential case, the differential with a differential action limiting mechanism for controlling optionally differential action limiting force can be obtained using the conventional differential mechanism as it is or by modifying slightly the design of the differential mechanism.

In addition, according to a second aspect of the invention, there is provided a differential with a differential action limiting mechanism as set forth in the first aspect thereof, wherein the output shaft for transmitting an engagement force generated by the actuator is a half shaft which continuously connects to an axle shaft of a drive wheel.

According to the construction of the differential with a differential action limiting mechanism, since an engagement force generated by the actuator is transmitted to the friction clutch member via the half shaft which does not change the direction of the axis thereof even if the position of the drive wheel changes, the engagement force of the actuator can be securely transmitted to the friction clutch member.

Note that a half shaft 11 and a left-hand axle shaft 13 described in embodiments may be directed to the output shafts of the invention, that a right-hand axle shaft 12 in the embodiments may be directed to the axle shaft of the invention, and that an internal combustion engine E in the embodiments may be directed to the engine of the invention.

BRIEF DESCRIPTION OF THE DRAWINGS

Further features and advantages of the invention can be ascertained from the following detailed description that is provided in connection with the drawings described below.

DETAILED DESCRIPTION OF THE PREFERRED EMBODIMENTS

Modes for carrying out the invention will be described below based on preferred embodiments of the invention illustrated in the accompanying drawings.

Figure 1:
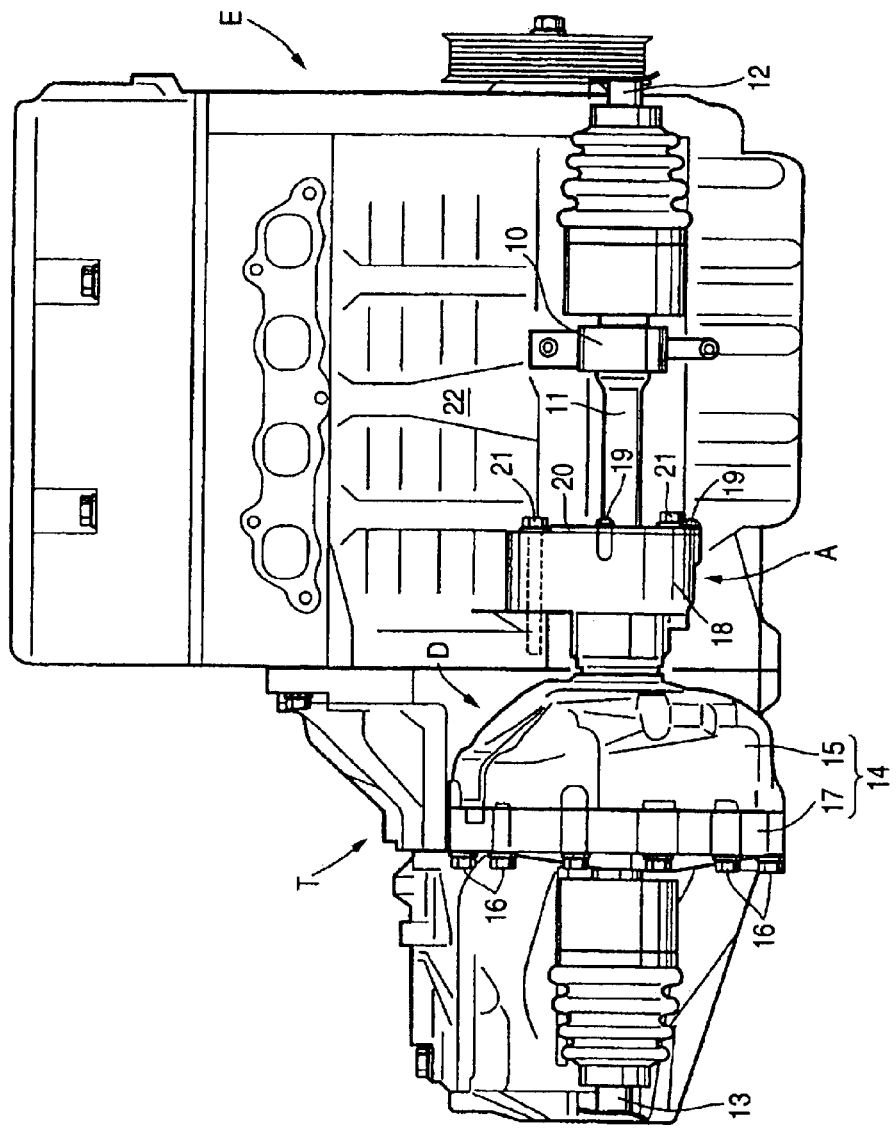
FIG. 1 is a rear view of an automotive internal combustion engine.
Figure 2:
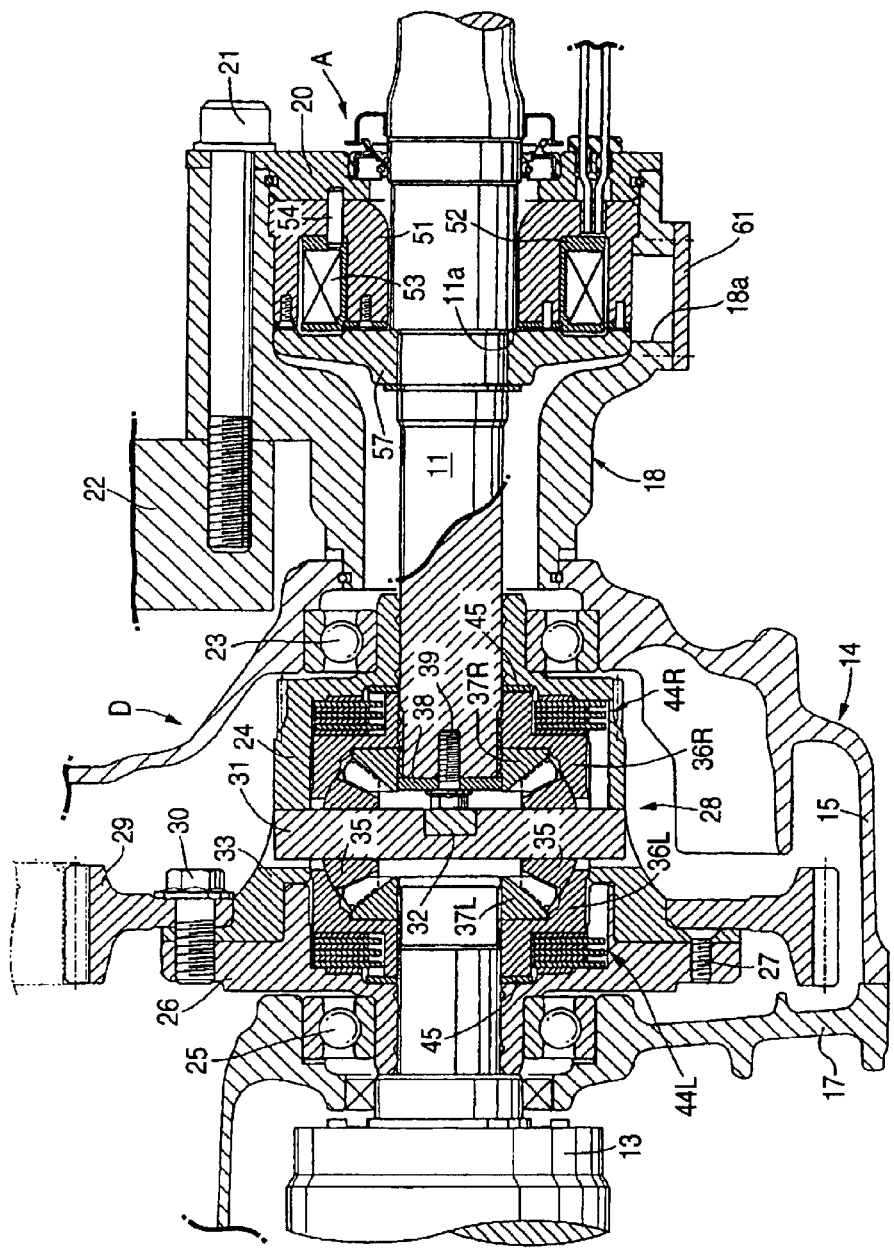
FIG. 2 is an enlarged sectional view of an differential mechanism and an actuator.
Figure 3:
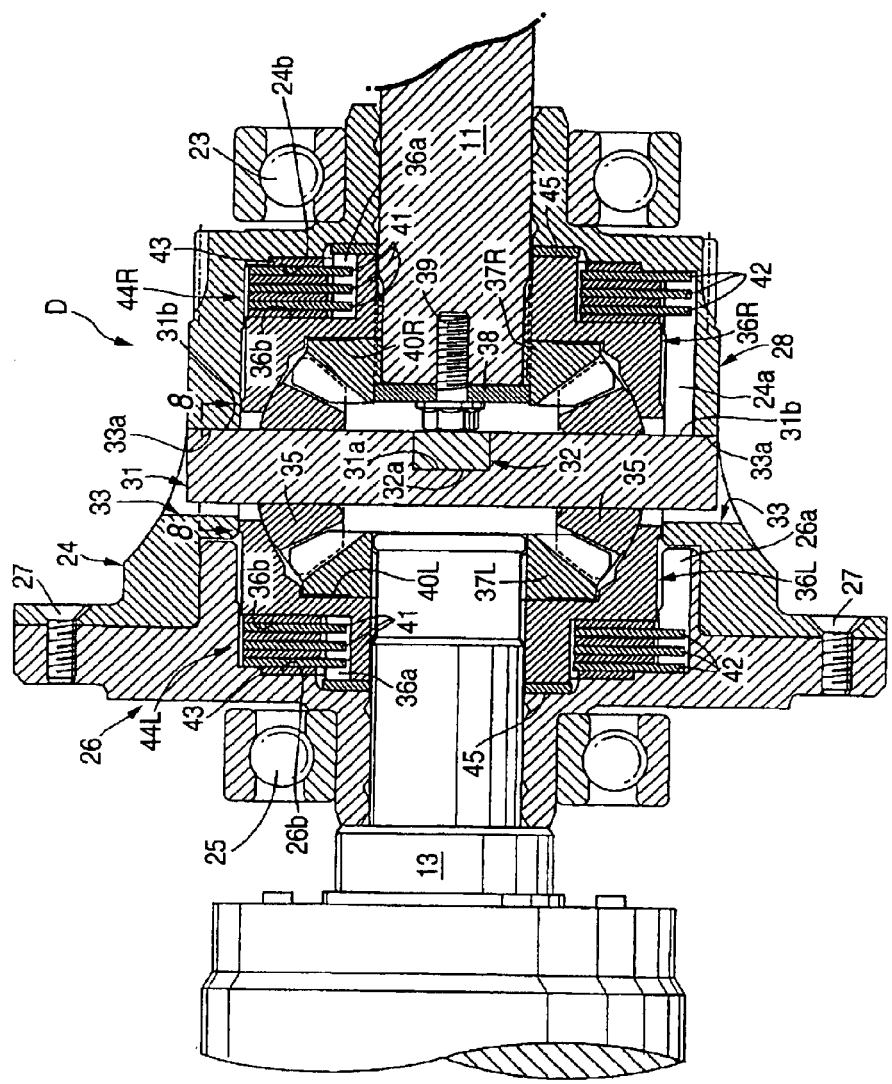
FIG. 3 is an enlarged view of a main part of FIG. 2 showing the construction of the differential mechanism.
Figure 4:
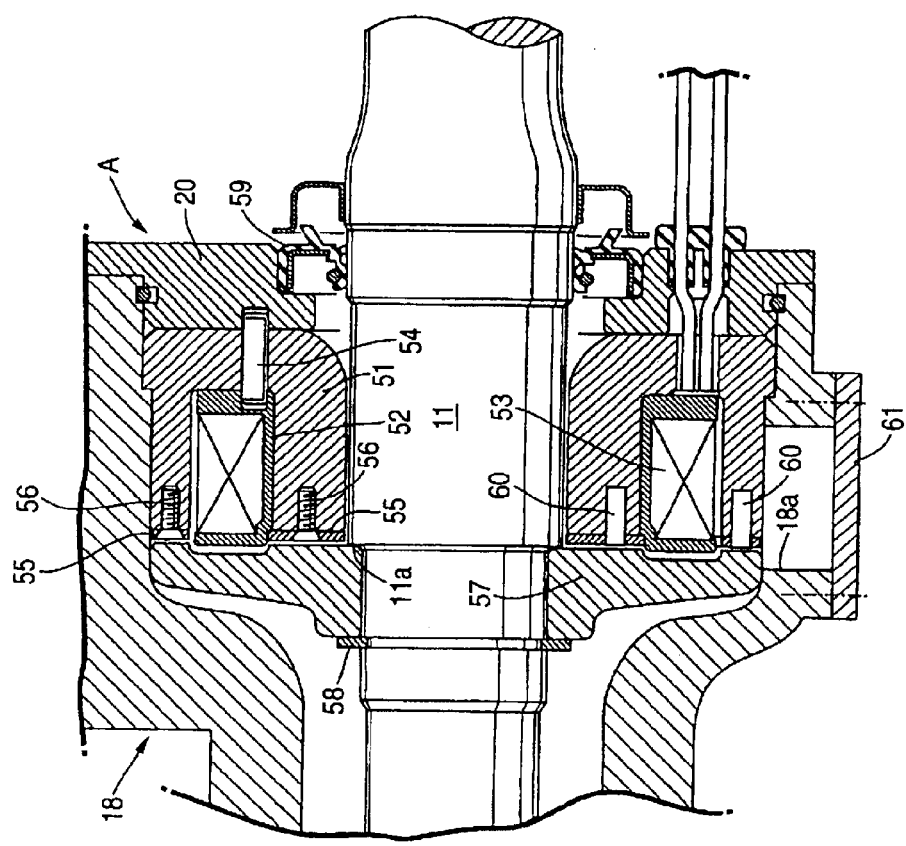
FIG. 4 is an enlarged view of another main part of FIG. 2 showing the construction of the actuator.
Figure 5:
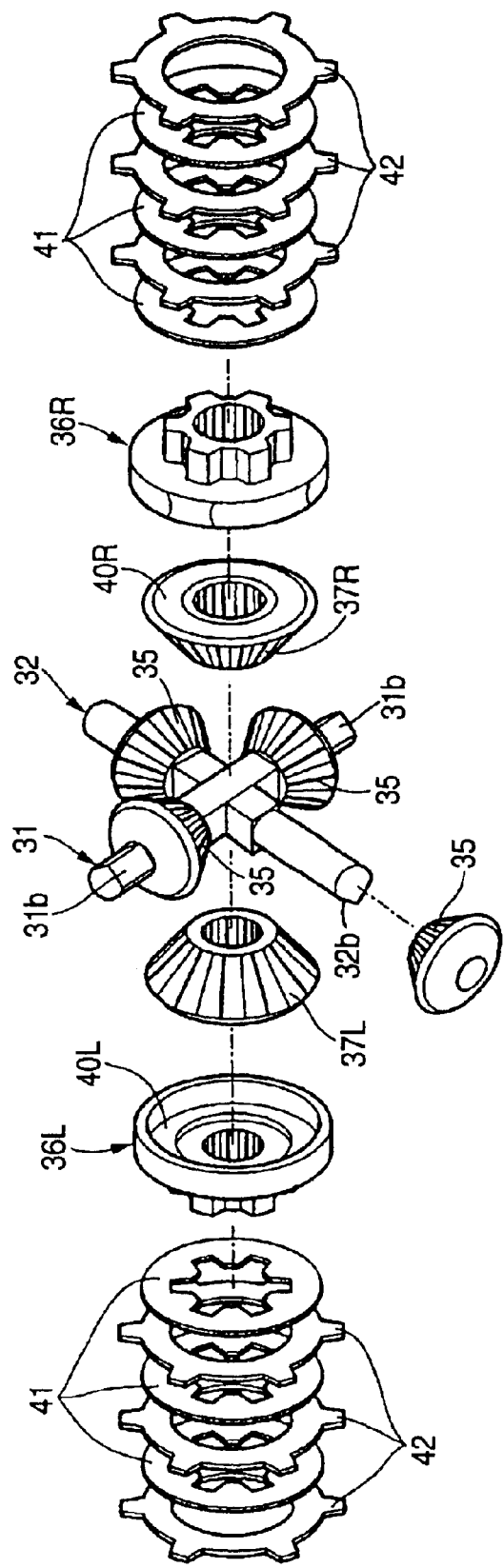
FIG. 5 is an exploded perspective view of constituent elements of the differential mechanism.
Figure 6:
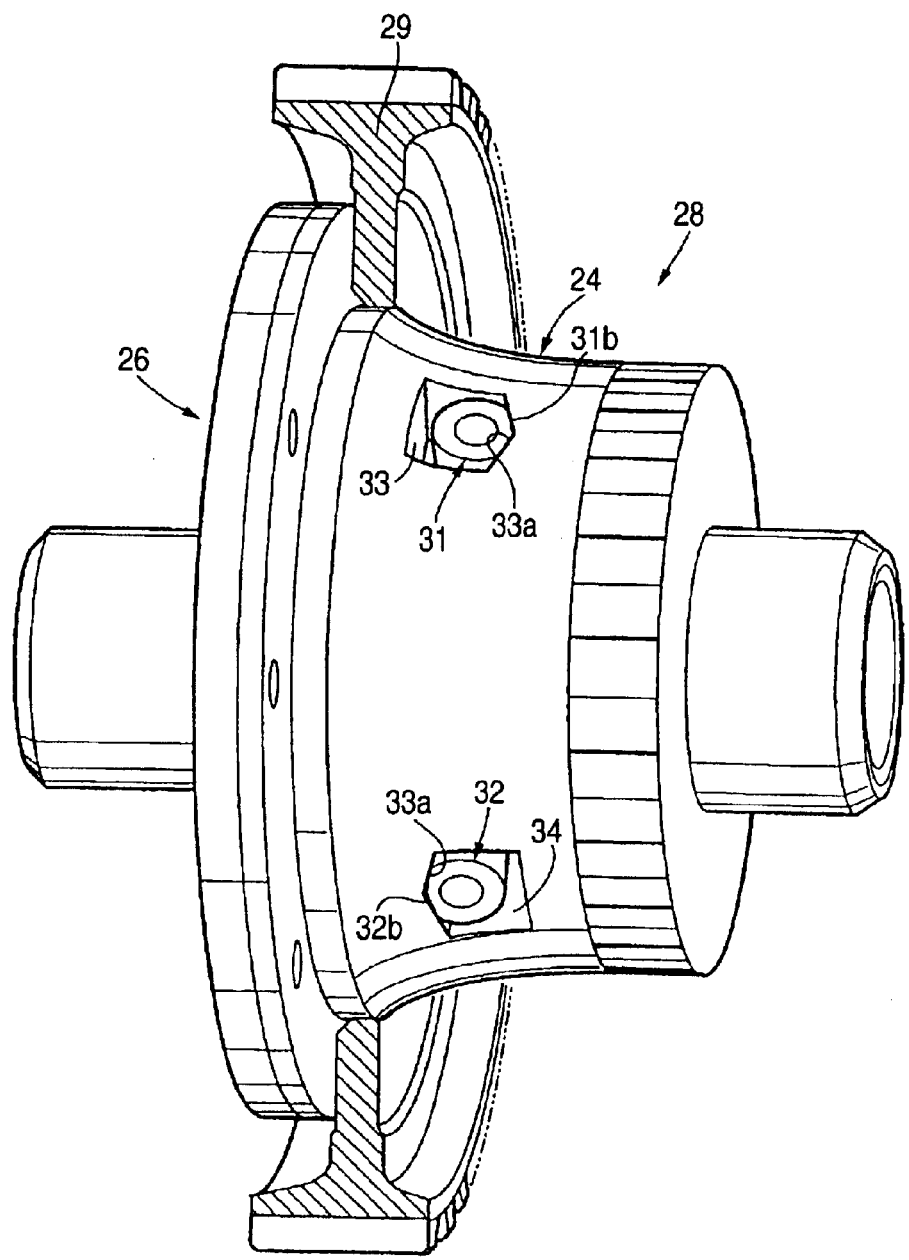
FIG. 6 is a perspective view of a differential case.
Figure 7:
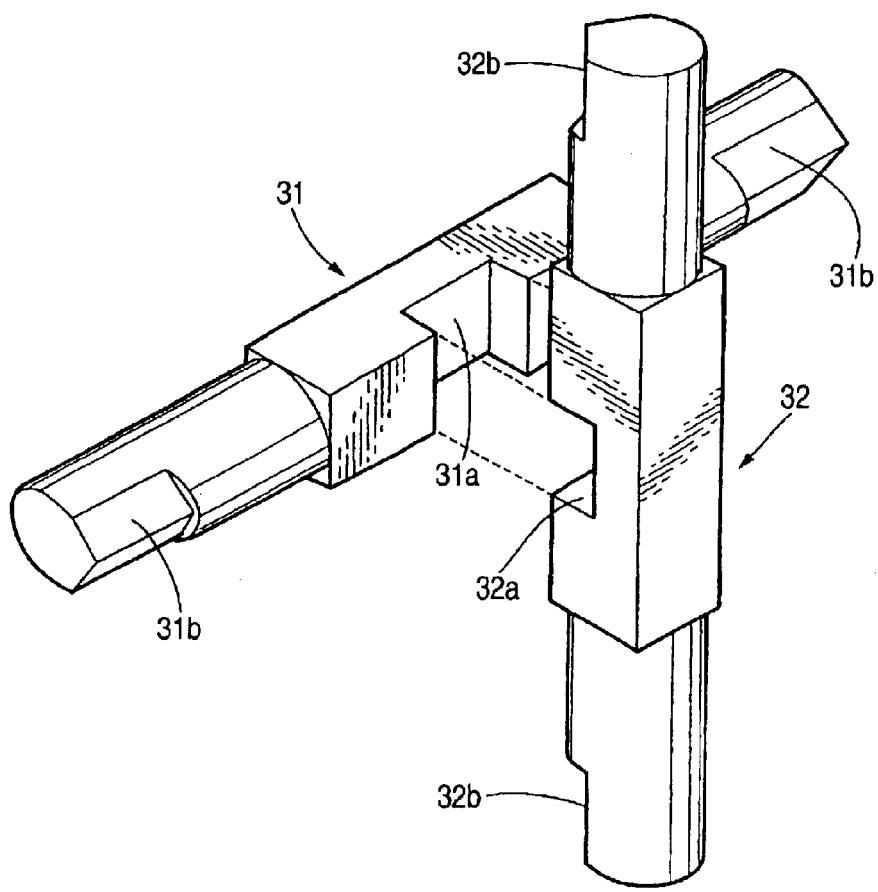
FIG. 7 is a perspective view of a pinion.
Figure 8A:
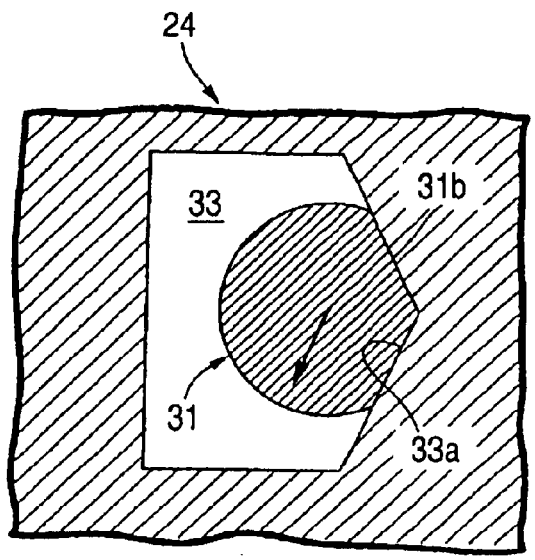
FIGS. 8A and 8B are sectional views taken along the line 8—8 in FIG. 3.
Figure 8B:
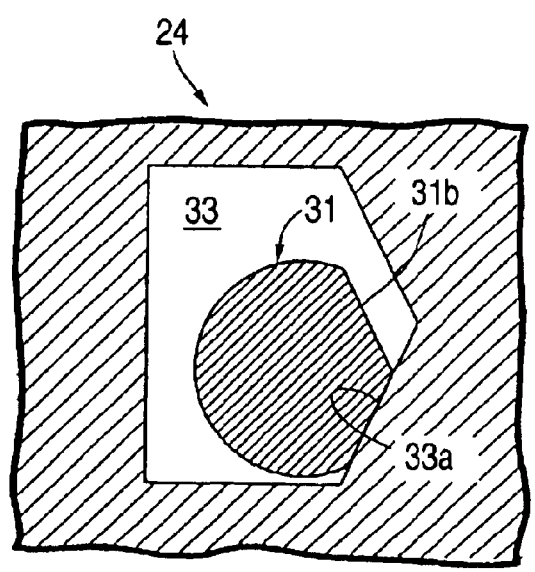
Figure 9:
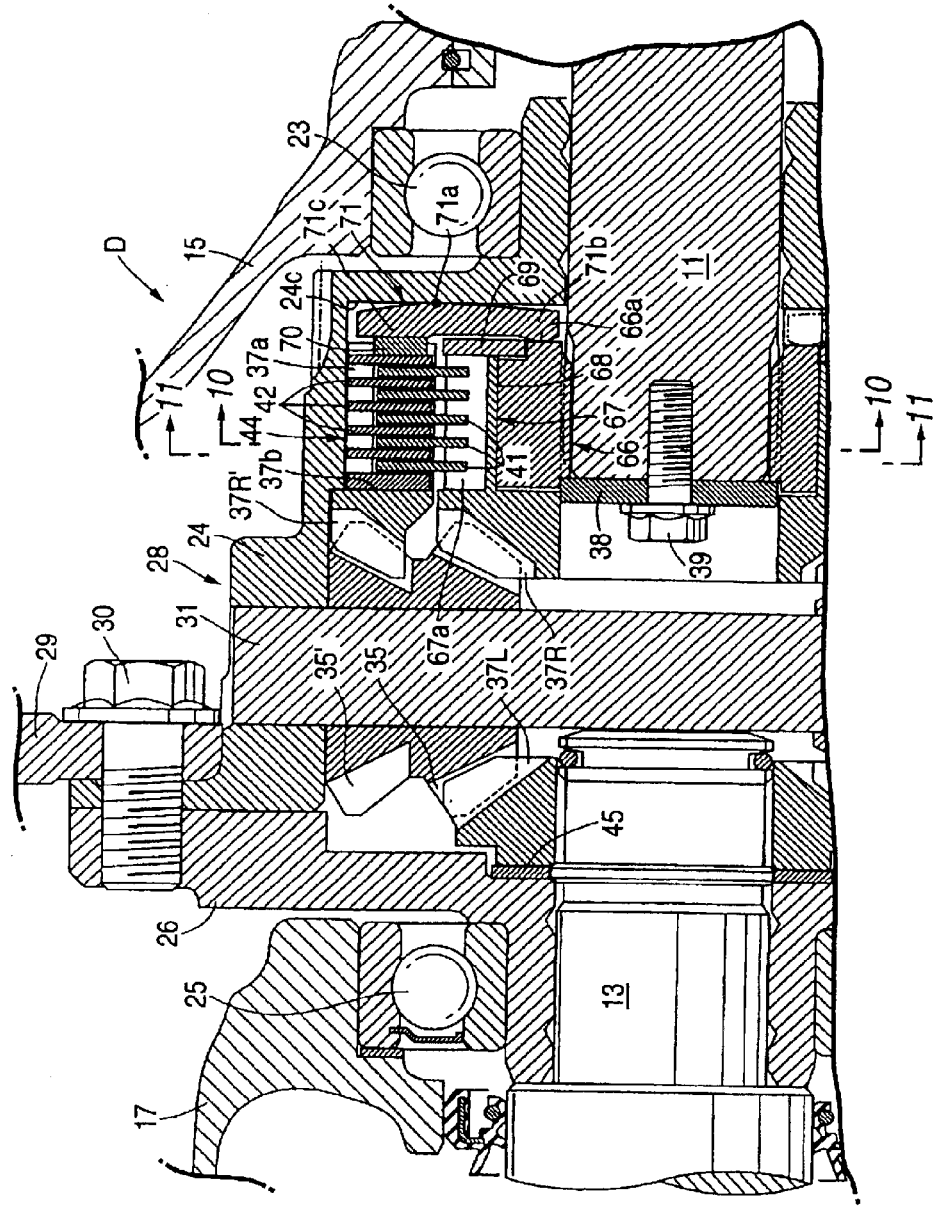
FIG. 9 is an enlarged sectional view of a main part of the construction of a differential mechanism according to a second embodiment of the invention.
Figure 10:
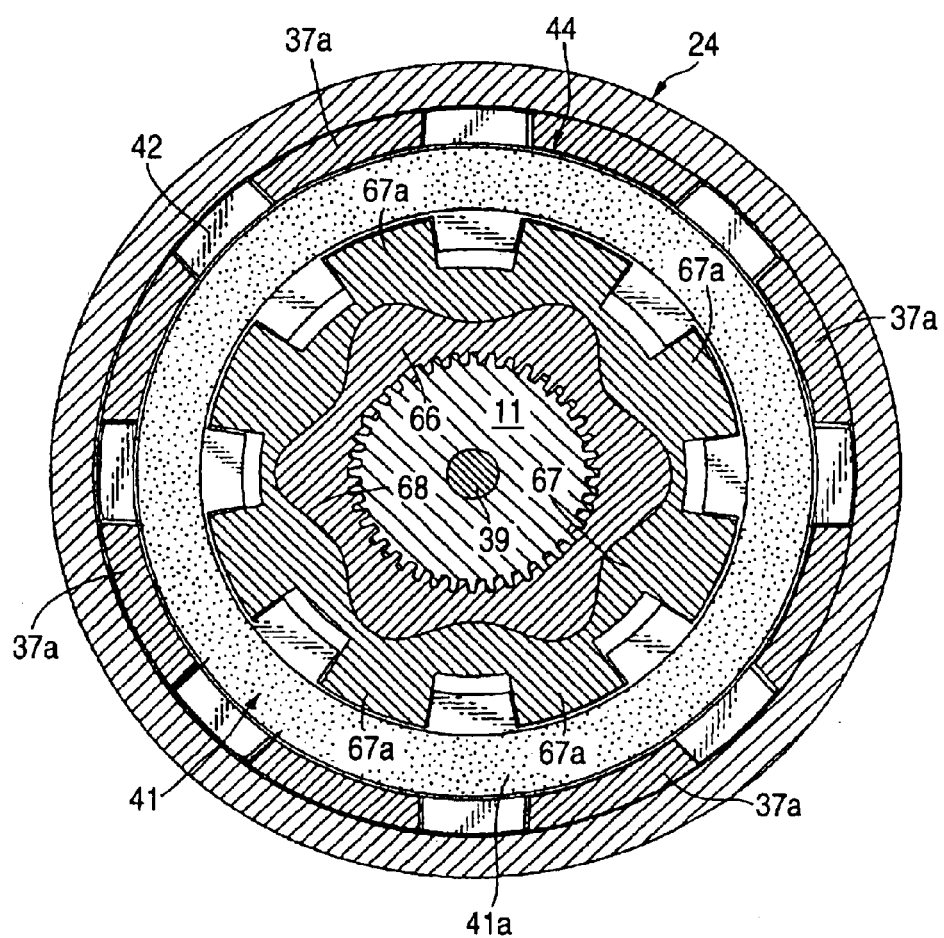
FIG. 10 is a cross-sectional view taken along the line 9—9 in FIG. 9.
Figure 11:
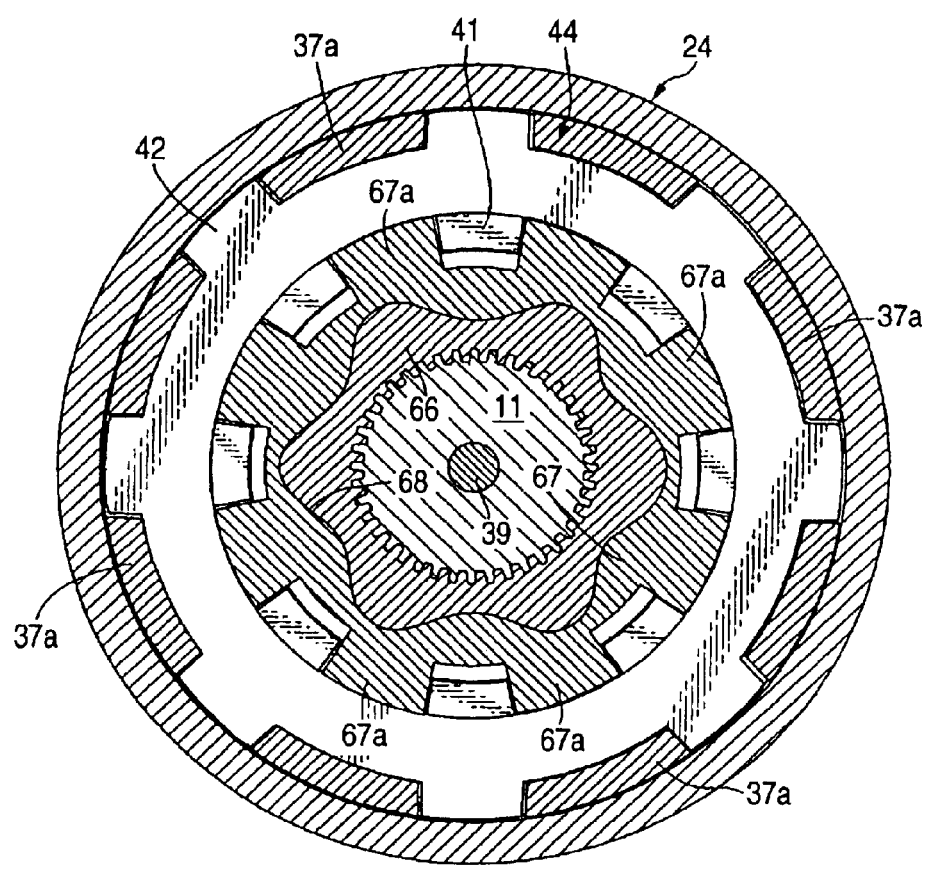
FIG. 11 is a cross-sectional view taken along the line 11—11 in FIG. 9.
Figure 12:
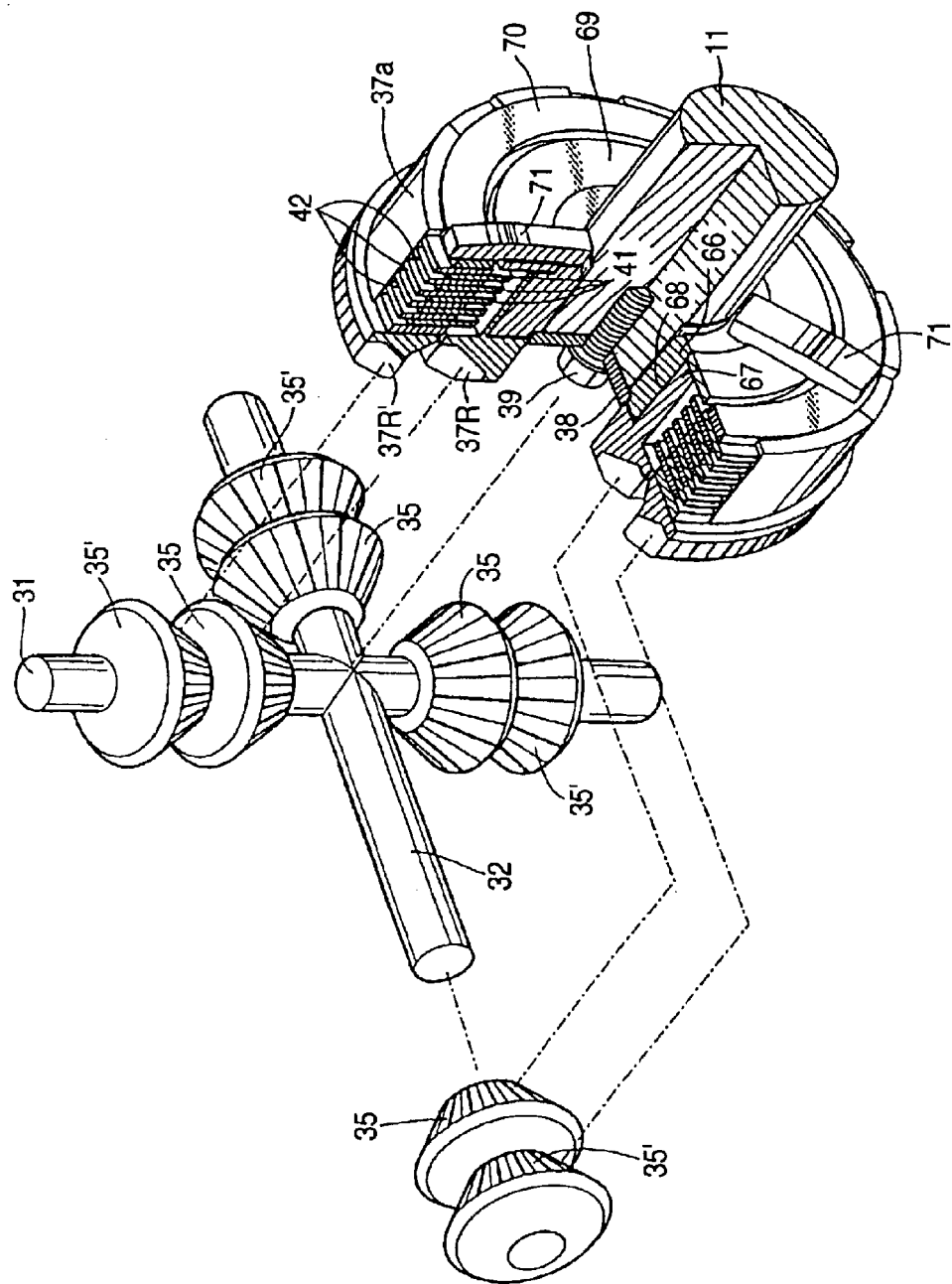
FIG. 12 is an exploded perspective view of constituent components of the differential mechanism.

FIGS. 1 to 8 show a first embodiment of the invention. FIG. 1 is a rear view of an automotive internal combustion engine, FIG. 2 is an enlarged sectional view of a differential mechanism and an actuator, FIG. 3 is an enlarged view of a main part of FIG. 2 showing the construction of the differential mechanism, FIG. 4 is an enlarged view of another main part of FIG. 2 showing the construction of the actuator, FIG. 5 is an exploded perspective view of constituent elements of the differential mechanism, FIG. 6 is a perspective view of a housing for a differential case, FIG. 7 is a perspective view of a pinion, and FIGS. 8A and 8B are sectional views taken along the line 8—8 in FIG. 3.

As shown in FIG. 1, a transmission T is integrally connected to a left-hand side of an internal combustion engine E mounted transversely in a front part of the body of a front-engine and front-wheel drive vehicle, and a differential mechanism D is provided on a rear face of the transmission T. A half shaft 11 (an intermediate shaft) extends in a rightward direction from the differential mechanism D which is disposed to be offset to the left from the center line of the vehicle body. A right-hand axle shaft 12 for driving a right-hand drive wheel (not shown) is connected to the half shaft 11, and a left-hand drive wheel (not shown) is driven via a left-hand axle shaft 13. A right end of the half shaft 11 is supported by a stay 10 fixed to an engine block 22.

As is clear when also referring to FIG. 2, a housing 14 which accommodates therein the differential mechanism D comprises a housing main body 15 formed integrally with a casing for the transmission T and a cover plate 17 fixed with a number of bolts 16 . . . in such a manner as to cover a left-end opening in the housing main body 15. An actuator A attached to a right-hand face of the differential mechanism D comprises an actuator case 18 fitting in a right-end opening in the housing main body 15 of the differential mechanism D and an actuator cover 20 fixed with three bolts 19 . . . in such a manner as to cover a right-end opening in the actuator case 18 and is fixed to the engine block 22 with two bolts 21, 21 which pass through the actuator case 18. The differential mechanism D and the actuator A constitute a differential according the invention.

The differential mechanism D accommodated in the interior of the housing 14 comprises a differential case 28 constituted by connecting together with a plurality of bolts 27 . . . a right-hand primary case 24 which is supported on the housing main body 15 by a ball bearing 23 and a secondary case 26 which is supported on the cover plate 17 by a ball bearing 25, and an axle drive gear 29 adapted to be driven by the transmission T is fixed to an outer circumference of the primary case 24 with a plurality of bolts 30.

Next, referring to FIGS. 5 to 8, the construction of the differential mechanism D will be described.

The differential mechanism D accommodated in the housing 14 comprises two pinion shafts 31, 32 which are assembled such that the shafts cross. The pinion shafts 31, 32 each having a circular cross section in general are each formed to have partially a quadrangular cross section at an intermediate portion thereof, and notches 31a, 32a are formed in the intermediate portions having the quadrangular cross sections. In addition, formed at end portions of the respective pinion shafts 31, 32 are V-shaped cam follower surfaces 31b, 31b; 32b, 32b in which two planes intersect with each other at a predetermined angle. Then, the two pinion shafts 31, 32 are assembled to cross in a state in which the respective notches 31a, 32a fit in each other in a slidable fashion. In this assembled state, a vertex of the cam follower surfaces 31b, 31b at the ends of the pinion shaft 31 is oriented rightward, while a vertex of the cam follower surfaces 32b, 32b at the ends of the other pinion shaft 32 is oriented leftward.

Four openings 33, 33; 34, 34 are formed in the housing main body 15 at intervals of 90 degrees, and the cam follower surfaces 31b, 31b of the pinion shaft 31 abut with V-shaped cam faces 33a, 33a formed on a pair of openings 33, 33 situated at diametrical ends, while the cam follower surfaces 32b, 32b of the other pinion shaft 32 abut with V-shaped cam faces 34a, 34a formed on a pair of openings 34, 34 situated at diametrical ends. Four differential pinions 35 . . . in total are rotatably supported at the end portions of the two pinion shafts 31, 32.

A side gear ring 36R and a differential side gear 37R are spline connected on an outer circumference of a left end of the half shaft 11 which fits in the primary case 24 relatively rotatably. A thrust washer 45 is disposed between the side gear ring 36R and the primary case 24, and the differential side gear 37R is fixed to the axial end of the half shaft 11 via a stopper plate 38 and a bolt 39. The differential side gear 37R meshes with the four differential pinions 35 . . ., and the differential side gear 37R and the side gear ring 36R are allowed to come into abutment with each other at an abutment surface 40R.

A plurality of friction discs 41 . . . (three in the embodiment) adapted to engage splines 36a formed around an outer circumference of the side gear ring 36R and a plurality of friction plates 42 . . . (three in this embodiment) adapted to engage splines 24a formed around an inner circumference of the primary case 24 are made to overlap each other in an alternate fashion, and furthermore, a washer 43 is disposed between the right-end friction disc 41 and a presser surface 24b on an inner wall of the primary case 24.

Similarly, a side gear ring 36L and a differential side gear 37L are spline connected on an outer circumference of a right end of the left-hand axle shaft 13 which fit in the secondary case 26 relatively rotatably. A thrust washer 45 is disposed between the side gear ring 36L and the secondary case 26. The differential side gear 37L meshes with the four differential pinions 35 . . ., and the differential side gear 37L and the side gear ring 36L are allowed to abut with each other at an abutment surface 40L.

A plurality of friction discs 41 . . . (three in this embodiment) adapted to engage splines 36a formed around an outer circumference of the side gear ring 36L and a plurality of friction plates 42 . . . (three in this embodiment) adapted to engage splines 26a formed around an inner circumference of the secondary case 26 are made to overlap each other in an alternate fashion, and a washer 43 is disposed between the left-end friction disc 41 and a presser surface 26b on an inner wall of the secondary case 26.

Thus, a right-hand friction clutch 44 is constituted by the presser surface 36b of the side gear ring 36R, the presser surface 24b on the inner wall of the primary case 24, and the disks 41 . . ., the friction plates 42 . . . and the washer 43 which are held between the presser surface 36b and the presser surface 24b, while a left-hand friction clutch 44L is constituted by the presser surface 36b of the side gear ring 36L, the presser surface 26b on the inner wall of the secondary case 26, and the friction discs 41 . . ., the friction plates 42 . . . and the washer 43 which are held between the presser surface 36b and the presser surface 26b.

Next, the construction of the actuator A will be described based on FIGS. 2 to 4.

A yoke 51 is accommodated in the interior of the actuator case 18 and the actuator cover 20, and a coil 53 wound around a bobbin 52 is received in a recessed portion formed in the yoke 51. The yoke 51 and the bobbin 52 are prevented from rotating relative to the actuator cover 20 with a knock-out pin 54. Two yoke plates 55, 55 which are divided to be situated radially outwardly and inwardly are fixed to a left-end face of the yoke 51 with a plurality of bolts 56, . . . , and an armature 57 facing left-end faces of the yoke plates 55, 55 via a minute air gap (for example, 0.5 mm) abuts with a stepped portion 11a of the half shaft 11 and is fixed in place with a clip 58. A seal member 59 is disposed between the actuator cover 20 and the half shaft 11 for preventing the penetration of dust into the interior of the actuator case 18. Magnetic flux density sensors 60, 60 are provided on the yoke plate 55, 55, respectively, for detecting a magnetic flux density generated in the yoke 51 when the coil 53 is excited. A peep window 18a is formed in the actuator case 18 for confirming the size of the air gap from the outside of the actuator case 18, and this peep hole 18a is covered with a removable cover 61.

Next, the function of the first embodiment of the invention will be described which is constructed as has been described heretofore.

The differential mechanism D is such that the mechanism exhibits a differential action limiting function in addition to the normal differential function, and a differential action limiting torque that is generated by the differential action limiting function is a sum resulting from the addition of a component proportional to a torque inputted into the differential mechanism D from the engine E and a component generated by the operation of the actuator A.

Firstly, the normal differential function of the differential mechanism D will be described.

When an output torque of the internal combustion engine E is inputted in the axle drive gear 29 of the differential mechanism D via the transmission T the differential case 28 connected to the axle drive gear 29 with the bolts 30 . . . rotates. When the vehicle is in a straight ahead driving condition the four differential pinions 35 . . . do not rotate relative to the pinion shafts 31, 32, and the left-hand axle shaft 13 which is made integrated with the left-hand differential side gear 37L which meshes with the differential pinions 35 . . . and the half shaft 11 which is made integrated with the right-hand differential side gear 37R which meshes with the differential pinions 35 . . . rotate at the same speed, whereby the torque is distributed equally to the left- and right-hand drive wheels.

For example, when the vehicle is taking a left turn since the left-hand axle shaft 13 connecting to the left-hand drive wheel is decelerated while the half shaft 11 connecting to the right-hand drive wheel is accelerated, there are generated differential rotations between the left- and right-hand differential side gears 37L, 37R. However, the differential rotations are absorbed by the rotation of the differential pinions 35 . . . which mesh with the left-and right-hand differential side gears 37L, 37R.

Next, the differential action limiting function will be described which is automatically activated by a torque inputted into the differential mechanism D from the internal combustion engine E.

When a torque is inputted into the differential case 28 while the vehicle is taking a turn as is described above the friction clutches 44L, 44R are caused to automatically engage each other, whereby the left-hand axle shaft 13 and the half shaft 11 are fastened to the differential case 28 to generate a differential action limiting torque for reducing the differential rotations. The friction clutches 44L, 44R engage each other through the following mechanism. Namely, when a torque is inputted into the differential case 28 from the internal combustion engine E, since the two pinion shafts 31, 32 connected to the drive wheels via the left-and right-hand differential side gears 37L, 37R and the differential pinions 35 . . . attempt to halt relatively to the rotating differential case 28, the cam follower surfaces 31b, 31b; 32b, 32b of the pinion shafts 31, 32 move from a position shown in FIG. 8A to a position shown in FIG. 8B while being guided along the cam surfaces 33a, 33a; 34a, 34a of the openings 33, 34 in the differential case 28.

As a result, the two pinion shafts 31, 32 which mesh with each other at the notches 31a, 32a move in directions in which the shafts are separated from each other, and the two differential pinions 35, 35 supported on the pinion shaft 31 push the left-hand differential side gear 37L to the left, this biasing the left-hand side gear ring 36L to the left via the abutment surface 40L, whereby the friction discs 41 . . . and the friction plates 42 . . . are held between the side gear ring 36L and the secondary case 26 to bring the left-hand friction clutch 44L into engagement. At the same time as this happens, the two differential pinions 35, 35 supported on the other pinion shaft 32 push the right-hand differential side gear 37R to the right, this biasing the side gear ring 36R to the left via the abutment surface 40R, whereby the friction discs 41 . . . and the friction plates 42 . . . are held between the side gear ring 36R and the primary case 24 to bring the right-hand friction clutch 44R into engagement.

In addition, since the engagement force for the friction clutches 44L, 44R is generated according to a torque inputted into the differential mechanism D, although the friction clutches 44L, 44R automatically engage even when the vehicle is in a straight ahead driving condition, no specific differential action limiting torque is generated since there exists no differential rotation originally between the left-hand axle shaft 13 and the half shaft 11.

Next, the differential action limiting function occurring when the actuator A is activated will be described.

When the coil 53 in the actuator A is energized the armature 57 is drawn by the yoke 51 within a range of the air gap of 0.5 mm, the half shaft 11 whose stepped portion 11a engages the armature 57 is biased to the right. The right end of the half shaft 11 is supported by the stay 10, and even if the right-hand axle shaft 12 is inclined in conjunction with the movement of the right-hand drive wheel supported by a suspension, the direction of the axis of the half shaft 11 does not change, whereby the drive of the half shaft 11 by the actuator A can be securely implemented.

When the half shaft 11 is biased to the right, since the right-hand differential side gear 37R fixed to the left end of the half shaft 11 biases the side gear ring 36R to the right via the abutment surface 40R, the friction discs 41 . . . and the friction plates 42 . . . are held between the primary case 24 and the side gear ring 36R to thereby bring the right-hand friction clutch 44R into engagement. When the right-hand friction clutch 44R is brought into engagement as has been described above, whereby the half shaft 11 is fastened to the differential case 28 the rotation of the four differential pinions 35 . . . which mesh with the right-hand side gear ring 36R which is made integrated with the half shaft 11 is restrained, and the rotation of the left-hand side gear ring 36L which meshes with those differential pinions 35 . . . is restrained, whereby the left-hand axle shaft 13 which is made integrated with the left-hand side gear ring 36L is indirectly fastened to the differential case 28.

Thus, an optional magnitude of differential action limiting torque can be exhibited in the differential mechanism D by controlling the magnitude of current supplied to the coil 53 in the actuator A.

As has been described heretofore, since the engagement force generated by the actuator A provided outside of the differential mechanism D is transmitted to the friction clutches 44L, 44R via the half shaft 11, an optional magnitude of differential action limiting torque can be exhibited in the differential mechanism D using the existing differential mechanism D as it is or by making only a minor modification thereto, and therefore, the construction according to the invention can contribute to the reduction of production costs when compared with a case where a new differential mechanism D is designed.

Next, a second embodiment of the invention will be described based on FIGS. 9 to 12. Note that in the second embodiment, like reference numerals to those used in the first embodiment are given to like members to those used in the first embodiment, so that repeated descriptions will be omitted.

The second embodiment is such that it differs from the first embodiment in the construction of the differential mechanism D but is substantially identical to the first embodiment with respect to the construction of the remaining part of the differential. Namely, a differential mechanism D accommodated in a housing 14 comprises two pinion shafts 31, 32 which are assembled to cross, and the pinion shafts 31, 32 are fixed to a primary case 24. Four pairs of integral differential pinions 35 . . . and differential action limiting pinions 35' . . . are rotatably supported on the pinion shafts 31, 32. The differential pinions 35 . . . are situated axially inwardly of the pinion shafts 31, 32, while the differential action limiting pinions 35' . . . are situated axially outwardly as viewed from an intersection point of the pinion shafts 31, 32.

An inner guide 66 is spline connected to an external circumference of a left end of a half shaft 11 which fits in a primary case 24 in such a manner as to rotate relative thereto, and a right-hand differential side gear 37R is fixed to the axial end of the half shaft 11 via a stopper plate 38 and a bolt 39. An outer guide 67 fits on an outer circumference of the inner guide 66 via a wave 68 (refer to FIGS. 10 and 11) axially slidably and relatively rotatably, and the differential side gear 37R which is formed integrated with the outer guide 67 meshes with the four differential pinions 35 . . . . A right end face of the inner guide 66 abuts with an inner end face of the primary case 24 relatively rotatably via a thrust washer 69. An annular differential action limiting side gear 37R' which is disposed axially and relatively rotatably on an outer circumference of the differential side gear 37R is rotatably supported on an inner circumference of the primary case 24, and this differential action limiting side gear 37R' meshes with the four differential action limiting pinions 35'

A gear ratio between the differential pinions 35 . . . and the differential side gear 37R differs from a gear ratio between the differential action limiting pinions 35' . . . and the differential action limiting side gear 37R'.

A plurality (five in this embodiment) of friction discs 41 . . . which are adapted to engage splines 67a formed around an outer circumference of the outer guide 67 which is integrated with the differential side gear 37R and a plurality (six in this embodiment) of friction plates 42 . . . which are adapted to engage splines 37a formed around the differential action limiting side gear 37R' are superimposed on each other in an alternate fashion on a right-hand side of an abutment surface 37b formed on the differential action limiting side gear 37R', and furthermore, a pressure plate 70 is disposed on a right-hand side of the right-end friction plate 42. Friction materials 41a . . . (refer to FIG. 10) are affixed to both sides of the friction discs 41 . . . which abut with the friction plates 42 . . . . A plurality (three in this embodiment) of grooves 24c . . . are radially formed in the inner surface of the primary case 24, and a lever 71 is received in each groove 24c. The lever 71 abuts with a bottom face of the groove 24c at a fulcrum 71a formed at a radially intermediate position thereof, abuts with a presser portion 66a formed on the inner guide 66 at a point of application of force 71b formed at a radially inner end thereof, and abuts with a right-hand face of the pressure plate 70 at a point of action formed at a radially outer end thereof.

Thus, a friction clutch 44 is constituted by the inner guide 66, the lever 71 . . . , the pressure plate 70, the friction discs 41 . . . and the friction plates 42 . . . .

On the other hand, a left-hand differential side gear 37L is spline connected on an outer circumference of a right end of a left-hand axle shaft 13 which fits in a secondary case 26 relatively rotatably, and a thrust washer 45 is disposed between the differential side gear 37L and the secondary case 26. The left-hand differential side gear 37L has the same number of teeth as that of the right-hand differential side gear 37R and meshes with the four differential pinions 35 . . . .

Note that the construction of an actuator A is substantially the same as that of the actuator A of the first embodiment.

Next, the function of the second embodiment of the invention will be described which is constructed as has been described heretofore.

The differential mechanism D is such that it exhibits a differential action limiting function by way of the operation of the actuator A in addition to the normal differential function, and the normal differential function is identical to that described in the first embodiment. However, when the differential pinions 35 . . . and the left- and right-hand differential side gears 37L, 37R which mesh with each other rotate the differential action limiting side gear 37R' which meshes with the differential action limiting pinions 35' . . . which are made integrated with the differential pinions 35 . . . also rotates, but since the friction clutch 44 disposed between the differential action limiting side gear 37R' and the differential side gear 37R is in a disengagement condition, the differential mechanism D can exhibit the differential function with no problem.

When a coil 53 in the actuator A is energized in order to make the differential mechanism D exhibit the differential function an armature 57 is drawn by a yoke 51 within a range of an air gap of 0.5 mm, and the half shaft 11 whose stepped portion 11a engages the armature 57 is biased to the right. When the half shaft 11 is biased to the right, since a stopper plate 38 fixed to a left end of the half shaft 11 biases the inner guide 66 to the right, the levers 71 . . . are pressed by a presser portion 66a of the inner guide 66 at points of application of force 71b . . . thereof and then swing on fulcrums 71a . . . thereof, whereby the pressure plate 70 is biased to the left by points of action 71c . . . of the levers 71 . . . .

As a result, the friction discs 41 . . . and the friction plates 42 . . . which are pressed by the pressure plate 70 are then pressed against the abutment surface 37b of the differential action limiting side gear 37R', whereby the friction clutch 44 is brought into engagement. As this occurs, the friction clutch 44 can be brought into engagement by magnifying the drive force of the actuator A at an optional ratio by altering the distance from the fulcrums 71a . . . to the points of application of force 71b . . . of the levers 71 . . . and the distance from the fulcrums 71a . . . to the points of action of the levers 71 . . . , that is, altering the lever ratio of the levers 71 . . . which function as a lever.

Thus, when the clutch 44 is brought into engagement, whereby the differential action limiting side gear 37R' is integrated with the differential side gear 37R, since the gear ratio between the differential pinions 35 . . . and the differential side gear 37R differs from the gear ratio between the differential action limiting pinions 35' . . . and the differential action limiting side gear 37R', the differential pinions 35 . . . and the right-hand differential side gear 37R are locked so that they cannot rotate, and the left-hand differential side gear 37L which meshes with the differential pinions 35 . . . are also locked so that they cannot rotate.

Thus, the rotation of the left- and right-hand differential side gears 37L, 37R are restrained by actuating the actuator A to thereby generate a differential action limiting torque in the differential mechanism D, and an optional magnitude of differential action limiting torque can be generated in the differential mechanism D by controlling the magnitude of current supplied to the coil 53 in the actuator A. In addition, since the differential action of the pair of differential side gears 37L, 37R is limited without the involvement of the differential case 28, not only is it difficult to generate a deviation between differential action limiting forces imparted to both the differential side gears 37L, 37R, respectively, but also the response of the differential action limiting action is increased. Moreover, since there is no need to limit the differential actions of the pair of differential side gears 37L, 37R via shafts which cross the pinion shafts 31, 32, the construction of the differential action limiting mechanism becomes complicated in no case.

In addition, since the engagement force generated by the actuator A provided outside the differential mechanism D is transmitted to the friction clutch 44 via the half shaft 11, any magnitude of differential action limiting torque can be exhibited in the differential mechanism D using the existing differential mechanism D or by making only a minor modification thereto, and therefore, the construction according to the embodiment of the invention can contribute to the reduction in production costs when compared with a case where a new differential mechanism D is designed.

Thus, while the embodiments of the invention have been described in detail, various modifications in design may be made to the invention without departing from the spirit and scope thereof.

For example, while the differential action is limited by fastening the left- and right-hand differential side gears 37L, 37R to the differential case 28 in the first embodiment, and in the second embodiment the differential action is limited by fastening the left- and right-hand differential side gears 37L, 37R together without involvement of the differential case 28, the invention may be applied to either of the aforesaid types of differential gears.

In addition, while according to the first embodiment, the differential action limiting torque which is in proportion to the torque inputted in the differential mechanism D from the internal combustion engine E and the differential action limiting torque which is generated by way of the operation of the actuator A are both generated, as is described in the second embodiment, the differential with a differential action limiting mechanism according to the invention is not necessarily required to generate the differential action limiting torques of the former embodiment.

Furthermore, while the actuators A according to the first and second embodiments are of an electromagnetic type, an actuator of a hydraulic type may be used.

Moreover, while the half shaft 11 is driven by way of the actuators A according to the first and second embodiments, the axle shaft may be driven directly.

Thus, according to the first aspect of the invention, since the actuator for generating the engagement force for bringing the friction clutches into engagement is not provided in the interior of the differential case but is provided outside of the differential case and on the axis of the output shaft, the engagement force generated by the actuator can be transmitted to the friction clutches via the output shafts, whereby an optional magnitude of differential action limiting torque can be generated in the differential mechanism. Then, since the actuator may be provided outside the differential case, the differential with a differential action limiting function can be obtained in which the differential action limiting torque can be optionally controlled using the existing differential mechanism or by making only a minor modification thereto.

In addition, according to the second aspect of the invention, in addition to the construction according to the first aspect of the invention, since the engagement force generated by the actuator is transmitted to the friction clutch via the half shaft whose axial direction does not change even if the position of the drive wheel changes, the engagement force of the actuator can securely be transmitted to the friction clutch.

What is claimed is:

1. A limited slip differential comprising:
   a differential case;
   a differential mechanism for distributing engine driving force that is inputted in said differential case to first and second output shafts;
   a friction clutch member for limiting differential rotations between said first and second output shafts; and
   an actuator for generating an engagement force for bringing said friction clutch member into engagement; said actuator being operable to axially move one of said output shafts to cause engagement of said friction clutch;
   wherein said actuator is provided on one of axes of said first and second output shafts and is disposed outside said differential case, to thereby transmit the engagement force generated by said actuator into said friction clutch member through said first or second output shaft.

2. The limited slip differential as set forth in claim 1, wherein said first output shaft is a half shaft which is to be coupled with an axle shaft of a drive wheel.

3. The limited slip differential as set forth in claim 2, wherein said half shaft comprises a step portion that is engaged with a moveable portion of said actuator, wherein said half shaft is moved in its axial direction in accordance with a movement of the movable portion.

4. The limited slip differential as set forth in claim 2, wherein said differential mechanism comprises a first differential side gear connected to said first output shaft and a second differential side gear connected to said second output shaft, said friction clutch member comprises a first friction clutch disposed between said first output shaft and said differential case and a second friction clutch disposed between said second output shaft and said differential case, and said first friction clutch is operated through said half shalt and said first differential side gear.

5. The limited slip differential as set forth in claim 3, wherein said differential mechanism comprises a first differential side gear connected to said first output shaft and a second differential side gear connected to said second output shaft, wherein said friction clutch member comprises a first friction clutch disposed between said first output shaft and said differential case and a second friction clutch disposed between said second output shaft and said differential case, and said first friction clutch is operated through said half shaft and said first differential side gear.

6. A limited slip differential comprising:
a differential case;
a differential mechanism for distributing engine driving force that is inputted in said differential case to first and second output shafts;
a friction clutch member for limiting differential rotations between said first and second output shafts;
an actuator for generating an engagement force for bringing said friction clutch member into engagement; and
an engagement force transmitting member for transmitting the engagement force generated by said actuator into said friction clutch member,
wherein said engagement force transmitting member includes a lever having;
a fulcrum,
a point of application of force pressed by said first output shaft, and
a point of action pressing said friction clutch member;
wherein said actuator is provided on one of axes of said first and second output shafts and is disposed outside said differential case, to thereby transmit the engagement force generated by said actuator into said friction clutch member through said first or second output shaft.

7. A limited slip differential comprising:
a differential case;
a differential mechanism for distributing engine driving force that is inputted in said differential case to first and second output shafts;
a friction clutch member for limiting differential rotations between said first and second output shafts;
an actuator for generating an engagement force for bringing said friction clutch member into engagement; and
an engagement force transmitting member member for transmitting the engagement force generated by said actuator into said friction clutch member,
wherein said engagement force transmitting member includes a lever having;
a fulcrum,
a point of application of force pressed by said first output shaft, and
a point of action pressing said friction clutch member;
wherein said actuator is provided on one of axes of said first and second output shafts and is disposed outside said differential case, to thereby transmit the engagement force generated by said actuator into said friction clutch member through said first or second output shaft; and
said first output shaft is a half shaft which is to be coupled with an axle shaft of a drive wheel.

8. A limited slip differential comprising:
a differential case;
a differential mechanism for distributing engine driving force that is inputted in said differential case to first and second output shafts;
a friction clutch member for limiting differential rotations between said first and second output shafts;
an actuator for generating an engagement force for bringing said friction clutch member into engagement; and
an engagement force transmitting member for transmitting the engagement force generated by said actuator into said friction clutch member,
wherein said engagement force transmitting member includes a lever having;
a fulcrum,
a point of application of force pressed by said first output shaft, and
a point of action pressing said friction clutch member;
wherein said actuator is provided on one of axes of said first and second output shafts and is disposed outside said differential case, to thereby transmit the engagement force generated by said actuator into said friction clutch member through said first or second output shaft;
wherein said half shall comprises a step portion that is engaged with a moveable portion of said actuator, wherein said half shaft is moved portion of said actuator; and
wherein said half shaft is moved in its axial direction in accordance with a movement of the movable portion.

9. The limited slip differential as set forth in claim 1, wherein said actuator is coaxially disposed with said first output shaft.

10. The limited slip differential as set forth in claim 2, further including a stay which is disposed about a portion of said half shaft and maintains an axial orientation of said half shaft relative to said differential.

11. The limited slip differential as set forth in claim 3, further including a stay which is disposed about a portion of said half shaft and maintains an axial orientation of said half shalt relative to said differential.

12. The limited slip differential as set forth in claim 4, further including a stay which is disposed about a portion of said half shaft and maintains an axial orientation of said half shaft relative to said differential.

13. A limited slip differential for a vehicle having first and second output shafts, said differential comprising:
a differential housing;
a differential case rotatably disposed in said housing;
a differential mechanism disposed in said housing for distributing engine driving force from said differential case to said first and second output shafts;
a friction clutch member disposed in said housing for limiting differential rotations between said first and second output shafts; and
an actuator for generating an engagement force for engaging said friction clutch member;
wherein said actuator is disposed substantially outside said differential housing and comprises a movable portion which is operatively attached to one of said first and second output shafts, and
wherein said actuator is operable to axially move one of said output shafts to cause engagement of said friction clutch member.

14. The limited slip differential as set forth in claim 1, wherein said actuator further comprises an armature which is operatively attached to one of said output shafts and said actuator is operable to cause axial movement of said output shaft.

* * * * *

UNITED STATES PATENT AND TRADEMARK OFFICE
CERTIFICATE OF CORRECTION

PATENT NO. : 6,857,982 B2
DATED : February 22, 2005
INVENTOR(S) : Tomari et al.

It is certified that error appears in the above-identified patent and that said Letters Patent is hereby corrected as shown below:

Column 2,
Line 1, change "be disposed coaxial with the at" to -- be disposed coaxial with at --;
Line 47, change "view of an differential" to -- view of a differential --.

Column 10,
Line 65, change "shalt and said" to -- shaft and said --.

Column 12,
Line 19, change "wherein said half shall" to -- wherein said half shaft --;
Line 36, change "shalt relative to" to -- shaft relative to --.

Signed and Sealed this

Seventeenth Day of May, 2005

JON W. DUDAS
*Director of the United States Patent and Trademark Office*